UNITED STATES PATENT OFFICE.

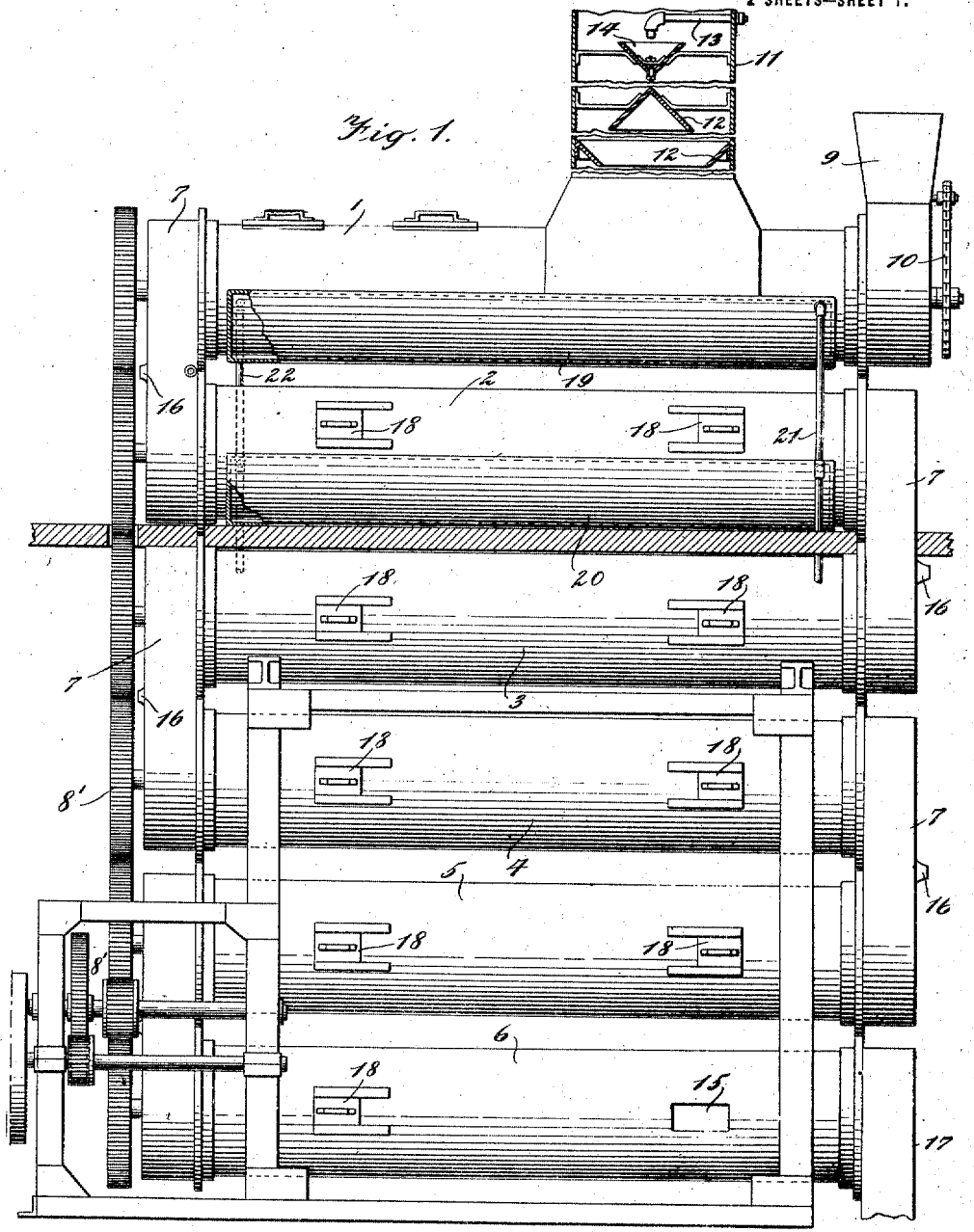

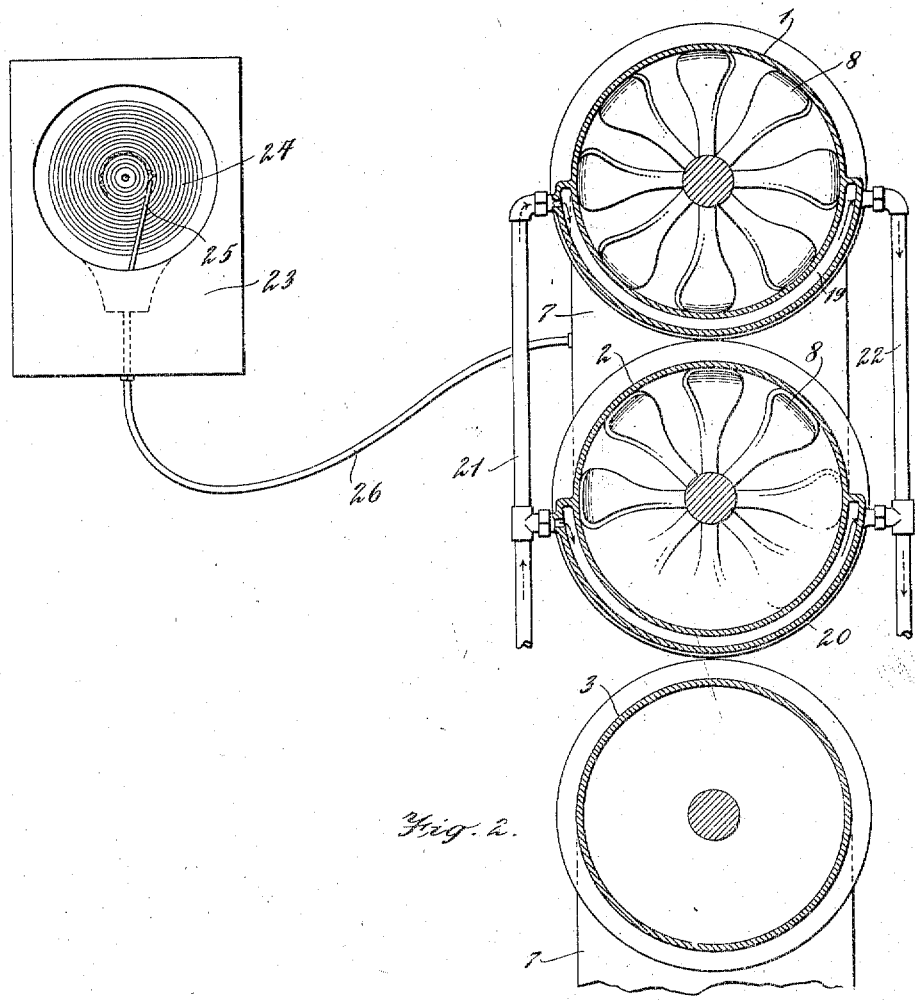

ALBERT ZIMMERMAN, OF YORK, PENNSYLVANIA, ASSIGNOR TO LOWELL M. PALMER, OF BROOKLYN, NEW YORK.

APPARATUS FOR HYDRATING LIME.

1,255,682.　　　　Specification of Letters Patent.　　Patented Feb. 5, 1918.

Application filed February 12, 1915. Serial No. 7,757.

*To all whom it may concern:*

Be it known that I, ALBERT ZIMMERMAN, a citizen of the United States, residing at York, in the county of York and State of Pennsylvania, have invented certain new and useful Improvements in Apparatus for Hydrating Lime, of which the following is a full, clear, and exact description.

This invention relates to an apparatus by which the process of hydrating lime may be carried on continuously and has for its primary object an apparatus which will yield a completely hydrated product consisting of a dry, smooth, amorphous powder. To obtain this product an excess of water is supplied to the lime to insure its complete slaking, and my invention contemplates furnishing additional heat to the lime during the slaking operation which will maintain the temperature of reaction of the lime and water sufficiently high to insure the complete slaking of the lime; otherwise, this temperature would fall below that required in the slaking zone of a continuous process, and would result in an inferior product.

My invention also contemplates supplying additional heat to the lime to drive off any moisture which remains after it has passed the slaking zone but before it is discharged from the apparatus, thereby insuring a perfectly dry product.

In the accompanying drawings, I have shown my invention associated with a known form of apparatus for the hydration of lime by the continuous process, Figure 1 showing one or more of the drums of the apparatus equipped with steam jackets, in accordance with one embodiment of my invention; and Fig. 2 being a detail view showing a transverse section through several of the drums, the thermometer attachment of the apparatus being also shown in this view.

To clearly understand the invention the parts of the apparatus which are old and well known, and which are similar to an apparatus disclosed by Kritzer in his Patent No. 932,789, dated August 31, 1909, will first be described, and thereafter the improvements forming the basis of this invention will be set forth in detail.

Generally speaking, the known apparatus comprises a series of hollow drums or chambers which are numbered 1 to 6 inclusive, and which are horizontally disposed and supported one above the other in vertical alinement. The adjacent open ends of each pair of drums are connected at alternate ends by means of casings or chambers 7, throughout the entire height of the apparatus, so that a zigzag course for the lime is provided through which it is carried by means of a plurality of spirally arranged stirrers or blades 8, which are driven in opposite direction in adjoining drums by the gearing 8′. In the specific forms shown two of the drums 1 and 2, respectively, are arranged above the floor line of the building, while the other drums are arranged below the same, so that the apparatus occupies two stories of a building, which construction is merely for convenience in delivering and discharging the lime from the apparatus.

At the righthand end of the upper drum 1 there is arranged a feed hopper 9 which will continuously deliver a predetermined quantity of the lime to the drum, the feeding mechanism being controlled by the gearing 10. Arranged in communication with the upper drum 1, adjacent this feed hopper 9, is the stack 11 which is only partially shown, and which is extended a suitable height above the machine, forming a passageway through which the air flowing through the drums is exhausted, as will be later referred to. The supply of water passes downward over a series of oppositely disposed conically-shaped plates 12, arranged in the stack, which break the stream of water into a cascade so that it enters the drum in finely divided particles, and will therefore more efficiently saturate the lime, the source of water supply at the top of the series of plates comprising a pipe 13 from which the water falls into a shallow overflow dish 14. The slaking operation begins to take place immediately in this drum and is generally completed before the lime is advanced by means of the stirrers 8 through the casings 7 into the second drum 2, where the slaking of any lime which has not been completely slaked in the first drum, will occur. The remaining drums 3, 4, 5 and 6, through which the lime is advanced by the stirrers serve as drying drums, in which the moist lime is completely dried by the air passing through the same. The greater volume of this air is permitted to enter the lower drum 6 through the openings 15 in the lower drum, although if desired, additional air inlets 16 may be provided in the casings 7 connecting the adjacent ends of the drums 3, 4, 5 and 6, respectively, the air passing through the zigzag course provided by the drums, up and out through the stack 11, due to a partial vacuum which is created in the stack by the condensation of the steam generated in the slaking zone or in the drum 1. The hydrated lime is discharged through the righthand end of the lower drum 6, where the output is regulated to the desired amount. The lime then passes through the passageway 17 to any desired bin or receptacle. Openings covered by slides 18 are provided in each of the faces of the drums so that access may be had to the interior of the same when it is desired to inspect the lime or remove it, the apparatus thus far described being the essential features of the Kritzer apparatus, as before referred to.

When used with the form of apparatus shown, my invention consists of providing one or more of the drums with a means by which the lime within these drums may be raised to a higher temperature than that caused by the endothermic reaction between the lime and water. In the specific embodiment shown, this means consists of steam jackets 19 and 20 which surround the lower halves of the two upper drums, that is, 1 and 2, respectively. Steam is admitted and exhausted from these jackets by means of the pipes 21 and 22, respectively, so that the temperature of the steam within the jackets may be regulated to the desired degree. If desired, these steam jackets might be placed around the entire periphery of the drum, but I find, since the drums are only partially filled with the lime, it is sufficient to inclose the lower half of the drum, i. e., the surface of the drum with which the lime remains in contact, and in this manner practically the entire heat from the steam jacket is transmitted directly to the lime within the drum.

Referring now to the thermometer attachment whereby the temperature of the slaking operation is indicated, the same preferably comprises any form of recording thermometer 23 consisting of the time-controlled revolving disk carrying a printing surface 24, upon which the pointer 25 traces a record which indicates any variation in the temperature of the slaking zone for a predetermined period. The thermometer is connected to the slaking zone of the drum and comprises a by-pass or tube 26 through which the vapor pressure of a liquid contained in a bulb and subjected to the temperature of the slaking operation is conducted to the pointer 25 and will affect the same.

The operation of the apparatus is in general similar to that shown and described in the Kritzer patent. The lime to be hydrated, which is of the required degree of fineness, is fed through the feed hopper 9 into the drum 1, and the water for slaking the same is admitted to this drum through the stack 7, where it is broken up into finely divided particles and saturates the lime within the drum, it being understood of course, that the feed of the hopper is controlled so that the lime only reaches a predetermined depth within the drum.

The stirrers 8 within this drum thoroughly mix the water and lime so that the slaking reaction commences to take place immediately, the lime being at the same time advanced slowly through the drum. It is here that the improved process is of value, for in the form of apparatus disclosed, the amount of water supplied is greatly in excess of the amount which is necessary to complete the hydration. The excess of water present therefore insures that the lime will be completely soaked and the hydration fully completed, or in other words, each particle of the lime will be slaked. With the old form of apparatus, if an excess of water was permitted to enter the drum, the temperature at which the slaking takes place due to the heat consumed in vaporizing the water or carried away by the air current, was reduced below that which is necessary for the efficient slaking of the lime. The additional heat necessary where an excess of water is used is therefore provided in the present apparatus by the provision of the steam heated drum by which the lime within the slaking zone is again raised to the proper temperature for the complete slaking, and is uniformly maintained at this temperature. In the actual carrying out of the process in the form of apparatus disclosed by me this temperature is about 190° Fahrenheit, which is found sufficient to insure the complete slaking of the lime.

This temperature is recorded by the thermometer 24 so that the operator of the machine has a convenient and visual indication of whether or not the slaking is taking place in the proper manner. If there is a rise in temperature in the drum this will be promptly recorded by the thermometer and the operator will know that the lime is commencing to burn, which may be prevented by increasing the water supply, and thereby lowering the temperature of the slaking operation. If, however, the temperature within the drum should drop below the standard temperature, then the operator will know that the lime is not being maintained at the proper heat for perfect hydration and he will either diminish his water supply or increase the feed of lime.

Since an excess of water is fed into the drum 1 the lime as it is advanced into the second of the series of drums, that is 2, by means of the stirrers 8, will contain a greater amount of moisture than if only the proper quantity of water were used. This moisture is driven from the lime by the current of air which passes in through the lower drum 6 or through the air inlets in the other drums and passes up through the drums in a direction opposed to the passage of the lime escaping through the stack 11.

In order to insure the complete drying of the material so that the product discharged from the lower drum will be sufficiently dried, the second of the drums is also preferably surrounded by a steam jacket which will raise the temperature of the lime within the drum, not to a point where it might cause the burning of the same, but to a degree at which the moisture within the lime will be driven off in vaporous form and conducted by the current of air into the stack. The other drums, that is, 3, 4, 5 and 6, could also be provided with steam jackets if it is found necessary to do so to insure the complete drying of the hydrated lime before it is discharged, or in other words, the hydrated lime will contain one per cent. (1%) or less of moisture.

It will be understood that the temperature which should be maintained to insure the complete slaking of the lime will vary with the character of the lime used, as the more resistant limes will require a greater degree of heat to be supplied by the steam jackets, since the temperature of reaction will be influenced by the purity, calcium oxid content and physical structure of the lime. However, with actual tests made on a pure, high calcium lime, with an excess of water three times the quantity of that necessary to combine chemically with the lime, I find that steam jackets are necessary to maintain the temperature at approximately 190° Fahrenheit, and does not rise above that point, resulting in a high grade product.

I claim—

1. In an apparatus for hydrating lime, a series of drums through which the lime is carried during treatment forming an elongated closed chamber, means for feeding the lime into the drum at one end of the series, means for supplying water in excess of the amount required for slaking to said lime adjacent the point where it is fed into said drum for creating a slaking zone within said drum, means for supplying a current of air passing through said drums, in a direction opposite to the direction in which the lime is carried through said drums, and means for supplying heat and water to the lime within the drum within which the slaking operation takes place in addition to that which is created by the endothermic reaction between the lime and the water, whereby the proper slaking temperature may be maintained with an excess of water present during the slaking operation.

2. In an apparatus for hydrating lime, a series of drums through which the lime is carried during treatment forming an elongated closed chamber, means for feeding the lime into the drum at one end of the series, means for supplying water in excess of the amount required for slaking to said lime adjacent the point where it is fed into said drum for creating a slaking zone within said drum, means for supplying a current of air passing through said drums in a direction opposite to the direction in which the lime is carried through said drums, means for supplying heat to the lime and water within the drum within which the slaking operation takes place in addition to that which is created by the endothermic reaction between the lime and water, and means for supplying additional heat to the lime in one at least of the other of said drums whereby the proper slaking temperature may be maintained with an excess of water present during the slaking operation and the lime completely dried before it is discharged from the apparatus.

In witness whereof, I subscribe my signature, in the presence of two witnesses.

ALBERT ZIMMERMAN.

Witnesses:
E. Philip Stair,
Andrew J. Hershey.